Oct. 8, 1935.　　　　P. MAKURATH　　　　2,016,929
LAWN MOWER
Filed April 28, 1933
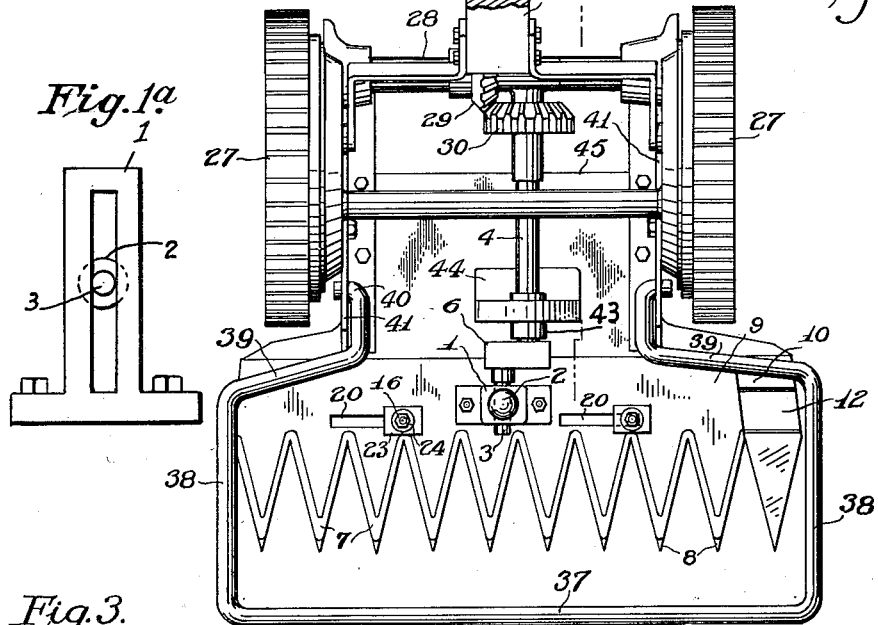
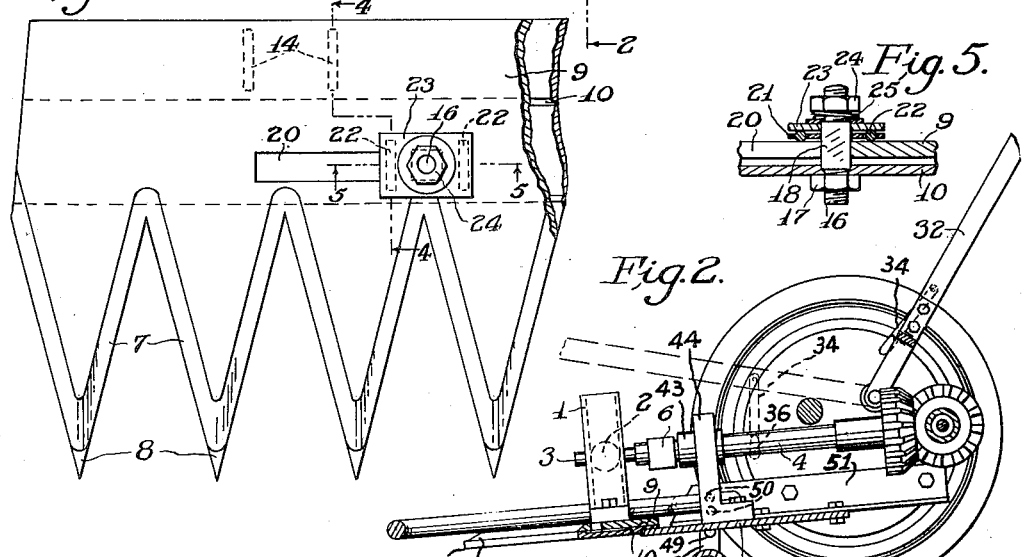
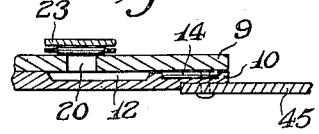
Inventor
PAUL MAKURATH.
By
Attorney Patented Oct. 8, 1935

2,016,929

UNITED STATES PATENT OFFICE 2,016,929

LAWN MOWER

Paul Makurath, Philadelphia, Pa.

Application April 28, 1933, Serial No. 668,321

12 Claims. (Cl. 56—260)

My invention is a lawn mower having sets of overlapping teeth and driving means, positioned intermediate the ends of the sets of teeth, by which one set of teeth is reciprocated relatively to the other set of teeth, without any tendency to lift the contacting surfaces of the respective sets of teeth from one another; the remainder of the movable cutter being anti-frictionally supported. An effective relation is established between the forward distance moved by the machine and the transverse movement of a forwardly extending cutting edge, whereby bending, pulling and uneven trimming of grass are prevented. Adjustable means is provided for trimming lawns to different lengths, and a handle is movable to different pushing positions; means being provided for holding the cutter in one of the pushing positions for lifting the teeth from cutting position. A front tooth guard is movable out of the way when it is desired to push the teeth close to an object, anti-friction rollers are prevented from axial displacement, and the movable cutter is a blade constructed in one piece. The fixed cutter is mounted on the top of a carrier plate, a driving shaft is anti-frictionally journalled, a gear shaft is desirably simplified, and other features are provided whereby the device is smooth, quiet and effective in operation, free from clogging by grass between the parts thereof, economical to manufacture, simple and durable in construction, and easy to handle.

In particular, a bearing element, carried by an eccentric arm on a drive shaft and laterally held relative to a stanchion on the movable cutter, has preferably rolling substantially point-to-point contact with the stanchion against which it moves laterally, while moving perpendicularly, to impart reciprocating movement thereto across the front of the machine, without imparting any substantial lifting movement thereof off the stationary cutter. This feature maintains the cutters in accurate cutting relation, reduces friction and rattle, prevents clogging the teeth with grass, and contributes to easy operation of the machine.

The cutters, in the form of plates or bands, have forwardly projecting substantially horizontal-plane triangular teeth disposed flat against each other, and backing portions offset to avoid contact with each other; these backing portions being interbraced and held relatively for a substantial distance, front to back, by laterally-spaced bearing and binding means therebetween, each having preferably rolling line-to-line or multiple point contact therewith, and the binding means exerting its binding forces between its bearing braces. By the latter structure, the frictionally engaging teeth and the anti-friction backs are pressed perpendicularly over wide areas, spaced front to back, to avoid fulcrum movement between the teeth, to widely and symmetrically distribute the binding forces free from irregular friction areas of varied pressures, and to hold the cutting edges in accurate relation.

Transversely-reciprocable, forwardly extending teeth are so geared to the running gear of the machine, or other driving means, that more complete lateral cutting movement of each movable tooth on a cooperating stationary tooth edge is effected, while the machine is moved forwardly a distance preferably less, but not substantially greater, than the front-to-back component distance of the effective cutting edge; this arrangement of parts ensuring, irrespective of the speed of operation of the machine, that all blades of grass, or other elements to be cut, shall be cut and not bent down or pulled up by the roots, and that a lawn or other growth shall be cut uniformly and not with ridges.

A convenient arrangement of the handle is effected whereby the machine may be pushed backwardly in substantially the same relation between the operator, the handle and the machine as exists during the cutting movement, thus obviating the requirement, as in ordinary lawn mowers, of pulling, instead of pushing, the device when it is desired to roll it easily from place to place, without cutting a lawn, unnecessarily wearing the working parts of the machine or imposing undue strain on the operator. To this feature also may preferably be added a means for latching or holding the handle to the cutter in the non-cutting pushing position of the handle, whereby the cutter teeth may be lifted off the ground and pushed backwardly over stony or other rough uneven areas otherwise likely to injure them.

A pony, or small idler truck or roller, is provided to support the teeth at a substantial distance from the pivotal position thereof about the axis of the main running gear or wheels, and is preferably made perpendicularly adjustable whereby to cut lawns to different heights.

A tooth guard, extending across the front of the machine, is adapted for movement by the operator's foot to a position where it is automatically held, in response to such movement, out of the way of an object such as a stump, a fence or the like, when it is desired to cut close to the object; the guard being similarly releasable by foot for movement back to its guarding position. This guard also lends itself to economical manufacture and convenient mounting and replacement by construction from a single length of resilient rod, of uniform section, for bending to shape and biasing in place for spring latch, or friction, positioning and easy release for movement between positions, and detachment from the machine.

In the device for binding the cutter plates toward each other normal to the plane thereof, roller bearings are provided to anti-frictionally transmit the binding force, and a binding bolt is provided with portions for non-turning relation to one of the cutters and a roller-bearing race member whereby to maintain the rollers in proper rolling position. All of the features will be better understood from a consideration of the following description and the accompanying drawing, in which—

Fig. 1 is a top plan view of a lawn mower constructed in accordance with one form of the invention; Fig. 1a is an enlarged front elevation of the connection between the driving mechanism and driven blade of the apparatus; Fig. 2 is a view taken substantially along the line 2—2 of Fig. 1; Fig. 3 is an enlarged detail view of a portion of the cutter structure, as shown in Fig. 1; and Figs. 4 and 5 are views taken substantially along the lines 4—4 and 5—5, respectively, of Fig. 3.

In the particular embodiment of the invention illustrated by the drawing, a stanchion 1, secured to a top movable cutter, has a cylindrical bore for the reception of a bearing element or ball 2 movably carried by an arm 3 that is disposed in side slots in the stanchion and is mounted in axially-eccentric position on a shaft 4, as by a crank arm 6; the ball being held by the stanchion against lateral movement relative to the stanchion but being perpendicularly movable therein. In the arrangement illustrated, the ball 2 is mounted rotatably on the arm 3 as an axis. However, I do not limit myself to this feature in all cases.

When the shaft 4 rotates, the ball 2 being of slightly smaller diameter than the stanchion bore, instantly engages the latter, substantially at a point tangent thereto and at a succession of such points by an anti-friction or rolling action in a vertical plane about the arm 3 substantially as it would if it were an infinitely thin disc in such plane; the bearing element 2 being provided as a ball to have substantial front-to-back support on the arm 3 and to permit the inner bearing surfaces of the stanchion to be of circular section. The latter construction is easier to manufacture accurately, by a simple milling operation, than would be the provision of accurate flat-plane surfaces for the same position and service.

Continued rotation of the shaft 4 alternately reverses the motion of the eccentric arm across the machine whereby the ball alternately engages opposite sides of the stanchion bore to move vertically thereon, with the rolling point-to-point action above described, and to consequently cause lateral reciprocating movement of the stanchion and its attached cutter free from friction and its resultant lifting movement.

The upper and lower cutters have forwardly projecting tapered or triangular teeth 7 and 8, respectively, disposed in substantially horizontal flat-plane engagement, and perpendicularly offset backing portions 9 and 10, respectively; this offset being accentuated, as by a groove 12, in the stationary bottom cutter, to preclude any possibility of frictional engagement at a position opposite binding means therefor, as will hereinafter appear, and where the cutters are unsupported against the binding force. The groove, or an equivalent feature, may be in the upper, instead of the lower, cutter and may be provided by bending one of the cutter plates, or by an assembly of component plates, and have its bottom surface continued to the rear edges of the cutter.

Rearwardly of the groove 12, or on its bottom surface, if continued rearwardly, relatively long, laterally-spaced, front-to-back bracing is provided between the cutters, preferably by the use of rollers 14, having line contact with the cutters and thereby reducing friction to substantially a minimum, or a substantially equivalent structure employing balls in point contact with the offset adjacent cutter surfaces through a relatively great distance front-to-back; the principle being to have flat-plane directly engaging areas on the teeth and substantial parallel flat-plane teeth-backing areas which do not frictionally engage each other but are symmetrically interbraced by the rollers against the cutter binding forces in widely distributed relation thereover. This feature, by binding the cutters normally to the flat teeth surfaces and to the wide front-to-back rear or backing surfaces, practically eliminates fulcrum or pivotal movement of the cutters on each other, with the backing portions as pivots, and consequently retains the necessary friction areas of the teeth in permanent accurate relation of uniform pressure front to back. It also avoids the irregular or spotty frictional contact areas that usually exist between commercially produced plates in broad-surface contact, and consequently, provides smoother operation.

Upright binding bolts 16, secured to the lower cutter in the groove 12, as by nuts 17, have bodies 18 of rectangular section so disposed in rectangular slots 20 in the upper cutter as to normally clear the slot edges but to be prevented thereby from appreciable turning, whereby to avoid operating friction and to prevent loosening of the parts. The lower ends of the bodies 18 may be seated in rectangular countersunk recesses in the lower cutter, as an additional factor against turning of the bolt, and adapted to provide clamping shoulders against the lower cutter opposing the action of the nuts 17.

Each of roller-race plates 21, see Fig. 5, supports elongated rollers 22, spaced transversely at opposite sides of the bolts 16, in line contact with the top surface of the upper cutter and with the under surface of a binding plate 23 across the slots for rolling action laterally of the machine; the binding force of nuts 24, and of resilient washer or spring elements 25 on the bolts 16, being exerted between the rollers, and the arrangement imposing substantially frictionless pressure symmetrically distributed over wide areas of the cutter.

Reciprocable movement of the forwardly-extending movable cutter teeth across the path of operative movement of the machine is transmitted to these teeth from running gear or wheels 27 through a shaft 28, a bevel gear wheel 29 on the shaft 28 and a bevel gear wheel 30 on the shaft 4; a mechanism, by which the shaft 28 is connected to the wheels 27 to rotate only when the wheels roll forwardly, being of usual character not germane to this invention beyond the fact that it functions as stated.

The ratio of the movement of the cutter teeth to the movement of the wheels 27 is such that the effective cutting edges at one side of each tooth 7 moves through a complete cutting movement or cycle on a cooperating edge of a stationary tooth 8, while the machine is moving forwardly a distance less than the forward or front-to-back component length of the movable tooth edge. In other words, each movable tooth moves laterally from a position in register with a stationary tooth, as shown, to a similar position over a next adjacent stationary tooth, while the machine moves a distance less than the front-to-back depth of the teeth. This action ensures that every blade of grass entering between the teeth will be cut before it reaches the rear ends of the teeth, irrespective of the speed of operation, so that bending and pulling of the blades, cutting of the lawns with ridges therein, and clogging and stopping the machinery with grass will be prevented, in addition to obtaining other advantages such as faster operation and rendering it easier work for the operator.

A handle 32, as indicated in Fig. 1 and in full lines in Fig. 2, is in a normal angular position for pushing the machine forwardly, as in a usual machine of its type. However, in contradistinction to the usual machine, the handle 32 may be turned on its pivots to a position in front of the machine, as indicated by broken lines to the left, as viewed in Fig. 2. In this position of the handle, angularly disposed about a perpendicular from the main machine unit from the full-line position of the handle, the machine may be pushed backwardly by an operator walking freely toward the machine from the front along the horizontal diameter of the unit with which the handle coincides. Thus the many disadvantages of dragging or pulling the machine backwardly as in ordinary machines of this type and which cause so much inconvenience, are completely eliminated and a substantially improved mechanism obtained.

A latch or holding device 34, is provided on the handle and has an element 36 adapted to loop around the shaft 4 whereby, in the above described backward pushing movement of the machine, the cutters may be pivotally lifted off the ground about the axis of the wheels 27 as a fulcrum; it being only necessary to move the handle, and not to manually operate the latch, to effect the latching operation. The latch member, while pivoted to turn on the handle 32 about an axis at right angles to the shaft 4, is loose on its pivot so that it may swing also in the plane of the pivot and the outer face of the hook or latch is beveled so that, as the handle 32 is swung forwardly, the shaft 4 pushes the hook to one side as the hook descends below the level of the shaft. When the end of the hook is below the shaft, it is then free to swing beneath the shaft so as to engage and lift it when the handle 32 is again raised. This feature is of advantage, especially where the machine must be wheeled over stony ground or other areas where hard obstructions are likely to injure the teeth; it being a common practice, under such conditions, to manually carry the heavy ordinary machines.

A guard for the teeth 7 and 8 is preferably constructed of one piece of resilient metal rod of uniform cross section throughout, including a front portion 37, side arms 38 and rear portions 39 of oppositely facing substantially S-shape having alined trunnion-like portions 40 journalled in upstanding apertured plates 41 on the chassis; the portions 40 being biased away from each other and toward the plates 41 by an inherent spring bias in the guard itself. This construction adapts the guard for frictionally held position wherein the front portion 37 is in closely adjacent parallel-plane relation to the teeth forwardly of the latter, as shown, or in a position upwardly from, and to the rear of, the teeth, when it is desired to move the teeth closer to a stump, a fence or other large object; the guard being easily movable between these portions by foot or hand operation and easily mounted in place or removed for replacement or other purpose, merely by bending the side arms 38 toward each other to remove the trunnions 40 from the apertured chassis plates 41.

An anti-friction bearing 43 is supported between the shaft 4 and a standard 44 on a bottom chassis plate 45 whereby to assist the anti-friction features of the eccentric and stanchion structure, and to cooperate with the rolling braces between the cutters and in the binding means thereof, to render the device smooth, quiet and effective in operating.

The stationary cutter is mounted over a top surface of the carrier plate 45, as shown more clearly in Fig. 4. The movable cutter is constructed entirely in one homogeneously integral piece, and the stationary lower teeth 8 are longer than, or project forwardly beyond the front ends of, the movable teeth to protect the latter. The shaft 28 is simple and free from couplings or other elements, and a pony truck or auxiliary running gear 30 47 supports the cutter forwardly of its pivot about the axis of the main running gear or wheels 27. The gear 47 is perpendicularly adjustably secured to the chassis, as by a support 48 having a vertical series of openings 49 therein for the selective reception of screws 50 supported in front-to-back chassis members 51 of angle section. The latter feature provides means whereby lawns may be cut to different lengths or heights.

Having described my invention, I claim—

1. A lawn mower cutter driving mechanism including an elongated member on the cutter, means laterally held relative to said member including an element constructed and arranged to have longitudinal rolling substantially point-to-point contact therewith, and a shaft supporting a member eccentric to said shaft and movably carrying the contact element.

2. A lawn mower cutter driving means including a stanchion on the cutter having an upright surface of curved section, means laterally held relative to the stanchion including a ball next to said surface, and a shaft supporting a member eccentric to said shaft and carrying the ball.

3. A lawn mower cutter driving means including a stanchion on the cutter, a bearing element laterally held for rolling movement on the stanchion, a shaft and an element mounted eccentrically on the shaft movably carrying the bearing element.

4. A lawn mower cutter driving means including a stanchion on the cutter, a shaft supporting an eccentric axial arm extending across and laterally held to a portion of the stanchion, and means on the chassis supporting the shaft and having rolling contact therewith.

5. A lawn mower cutter-bar mounting including means for binding two cutters together and clamped to one of the cutters and including elements having rolling bearing action relative to the other cutter, the binding means exerting its force in a line lying between said elements.

6. A lawn mower cutter-bar mounting including elements, one of which is provided with a slot, roller bearings on one of said elements and extending across the slot, a race member for the rollers, and means binding the elements together through the intermediary of the rollers including a bolt held against turning relative to one of the elements and to the race member.

7. A lawn mower cutter-bar mounting including members having offset bearing portions and spaced binding portions, a rolling bearing element between the bearing portions, and means binding the members to each other including a rolling bearing element engaging one of said binding portions.

8. A lawn mower cutter-bar mounting including members with backing sections having offset bearing portions and spaced binding portions, a rolling bearing element between the bearing portions, means binding the cutters to each other including a rolling bearing element engaging one of said binding portions, and driving means including a stanchion on one of the members, a rolling bearing element laterally held to the stanchion, and a shaft carrying an eccentric arm movably supporting said last named bearing element.

9. A lawn mower cutter-driving mechanism including stationary lower and movable upper cutter bars extending across the mower path and having forwardly projecting teeth, a tubular stanchion on the upper bar having a cylindrical bore and a rearside slot, an apertured ball in the bore, an arm extending through the slot and the ball, a shaft on which the arm is eccentrically mounted, and a gear connection for driving said shaft.

10. A lawn mower cutter-bar mounting including movable elongated upper and lower bars extending transversely of the cutter movement, said lower bar having a longitudinal channel in its upper side and the upper bar having longitudinally-spaced longitudinal slots over the channel, laterally-spaced roller bearings extending transversely of the bars therebetween, said bearings also being between said channel and the rear side edges of the bars, plates over the upper bar, and binding means including posts projecting upwardly from the lower bar through said slots and through said plates, and roller bearings extending front to back at opposite sides of each post between the adjacent plate and the top bar.

11. A lawn mower cutter-bar mounting including strap-like plates having forward side-edge teeth in horizontal plane contact, said plates having also areas along the rear ends of the teeth in which the plates are vertically separated and areas along and behind the separated areas engaging in horizontal plane contact for a substantial distance front to back, and means binding the plates together acting vertically through the plates opposite said separated areas.

12. A lawn mower cutter guard constructed as a one-piece resilient rod having a transverse front section, front to back side sections and rear ends bent transversely away from each other for position in bearing apertures, said guard having a shape and resilience biasing said ends away from each other to normally lock the guard in position toward said bearings.

PAUL MAKURATH.